(12) United States Patent
Henning et al.

(10) Patent No.: US 8,598,295 B2
(45) Date of Patent: Dec. 3, 2013

(54) METHOD FOR PRODUCING BRANCHED SIH FUNCTIONAL POLYSILOXANES AND THE USE THEREOF FOR PRODUCING SIC- AND SIOC-LINKED, BRANCHED ORGANOMODIFIED POLYSILOXANES

(75) Inventors: Frauke Henning, Essen (DE); Wilfried Knott, Essen (DE); Horst Dudzik, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 279 days.

(21) Appl. No.: 12/744,270

(22) PCT Filed: Sep. 23, 2008

(86) PCT No.: PCT/EP2008/062662
§ 371 (c)(1),
(2), (4) Date: May 21, 2010

(87) PCT Pub. No.: WO2009/065644
PCT Pub. Date: May 28, 2009

(65) Prior Publication Data
US 2010/0249339 A1     Sep. 30, 2010

(30) Foreign Application Priority Data

Nov. 21, 2007  (DE) .......................... 10 2007 055 485

(51) Int. Cl.
*C08G 77/08* (2006.01)
(52) U.S. Cl.
USPC .................................. 528/23; 528/15; 528/31
(58) Field of Classification Search
USPC ................................................ 528/15, 23, 31
See application file for complete search history.

(56) References Cited

U.S. PATENT DOCUMENTS

| | | | |
|---|---|---|---|
| 2,758,124 A | 8/1956 | Schwenker | |
| 4,631,208 A | 12/1986 | Westall | |
| 5,430,166 A | 7/1995 | Klein et al. | |
| 5,455,367 A | 10/1995 | Klein et al. | |
| 5,475,127 A | 12/1995 | Klein et al. | |
| 5,548,050 A * | 8/1996 | Kushibiki et al. | 528/9 |
| 6,291,622 B1 | 9/2001 | Droese et al. | |
| 6,307,082 B1 | 10/2001 | Klein et al. | |
| 6,562,408 B1 * | 5/2003 | Costa et al. | 427/376.2 |
| 6,730,749 B1 | 5/2004 | Burkhart et al. | |
| 6,790,451 B2 | 9/2004 | Nakanishi | |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 8,138,294 B2 * | 3/2012 | Henning et al. | 528/12 |
| 2004/0176561 A1 * | 9/2004 | Janeiro | 528/12 |
| 2005/0075468 A1 * | 4/2005 | Knott et al. | 528/15 |
| 2005/0119434 A1 | 6/2005 | Chayama et al. | |
| 2005/0136269 A1 * | 6/2005 | Doehler et al. | 428/447 |
| 2007/0128143 A1 | 6/2007 | Gruning et al. | |
| 2007/0207176 A1 * | 9/2007 | Kamei et al. | 424/401 |
| 2008/0125503 A1 | 5/2008 | Henning et al. | |
| 2008/0153934 A1 | 6/2008 | Neumann et al. | |
| 2008/0153992 A1 | 6/2008 | Knott et al. | |
| 2008/0153995 A1 | 6/2008 | Knott et al. | |
| 2009/0030097 A1 | 1/2009 | Knott et al. | |
| 2009/0137751 A1 | 5/2009 | Knott et al. | |
| 2009/0137752 A1 | 5/2009 | Knott et al. | |
| 2010/0022435 A1 | 1/2010 | Henning et al. | |
| 2010/0029587 A1 | 2/2010 | Brueckner et al. | |
| 2010/0041910 A1 | 2/2010 | Schubert et al. | |
| 2010/0056649 A1 | 3/2010 | Henning et al. | |
| 2010/0071849 A1 | 3/2010 | Knott et al. | |
| 2010/0081781 A1 | 4/2010 | Schubert et al. | |
| 2010/0105843 A1 | 4/2010 | Knott et al. | |
| 2010/0113633 A1 | 5/2010 | Henning et al. | |
| 2010/0168367 A1 | 7/2010 | Schubert et al. | |

FOREIGN PATENT DOCUMENTS

| | | |
|---|---|---|
| DE | 1125180 | 3/1962 |
| DE | 3716372 A1 | 11/1988 |
| DE | 102005004676 A1 | 8/2006 |
| EP | 0568318 A1 | 11/1993 |
| EP | 0675151 A1 | 10/1995 |
| EP | 0838547 A2 | 4/1998 |
| EP | 0967236 B1 | 11/2000 |
| EP | 1050553 A2 | 11/2000 |
| EP | 1439200 A1 | 7/2004 |
| EP | 1520870 A1 | 4/2005 |
| EP | 1717260 A1 | 11/2006 |
| GB | 996646 | 6/1965 |
| JP | 2002179797 | 6/2002 |
| WO | WO2005054371 A2 | 6/2005 |
| WO | WO2009065641 A1 | 5/2009 |

OTHER PUBLICATIONS

Gustavson, W. A., et al., "Metal Complex-Catalyzed Redistribution Reactions of Organosilanes", Journal of Organometallic Chemistry, Oct. 19, 1982, vol. 238, No. 1, pp. 87-97.
International Search Report Dated Jan. 16, 2009.

* cited by examiner

*Primary Examiner* — Margaret Moore
(74) *Attorney, Agent, or Firm* — Scully, Scott, Murphy & Presser, P.C.

(57) ABSTRACT

The invention provides a process for preparing branched SiH-functional siloxanes by converting a mixture of one or more low molecular weight SiH-functional siloxanes, one or more low molecular weight SiH-free siloxanes and one or more trialkoxysilanes with addition of water and in the presence of at least one Brønsted-acidic catalyst, which is characterized in that the reaction is performed in one process step.

14 Claims, No Drawings

METHOD FOR PRODUCING BRANCHED SIH FUNCTIONAL POLYSILOXANES AND THE USE THEREOF FOR PRODUCING SIC- AND SIOC-LINKED, BRANCHED ORGANOMODIFIED POLYSILOXANES

The invention relates to a process for preparing organically modified polysiloxanes branched in the siloxane chain, in which a branched polysiloxane having terminal and/or pendant SiH functions is prepared in only one process step and is functionalized further with organic compounds, and to branched organically modified polysiloxanes prepared by this process and to their use.

STATE OF THE ART

According to the prior art, polyorganosiloxanes are prepared by hydrolysis and condensation proceeding from methylchloro-hydrosilanes with mixed substitution. A direct hydrolytic condensation of hydrogen-containing silanes, for example dimethylmonochlorosilane or methyldichlorosilane, is described, for example, in U.S. Pat. No. 2,758,124. In this method, the siloxane phase which separates in the course of hydrolysis is removed from the water phase comprising hydrochloric acid. Since this process is prone to gelation of the hydrosiloxanes, DE 11 25 180 describes an improved process utilizing an organic auxiliary phase in which the hydrosiloxane formed is present dissolved as a separate phase in an organic solvent and, after removal from the acidic water phase and removal of the solvent by distillation, is resistant to gelation. A further process improvement with regard to minimized use of solvent is described by EP 0 967 236 and states in its teaching that at first only small amounts of water should be used in the hydrolytic condensation of the organochlorosilanes, such that, in the first step, hydrogen chloride is driven out in gaseous form and can be supplied as a material of value directly to further end uses.

Branched organically modified polysiloxanes can be described by a multitude of structures. Generally, a distinction has to be drawn between a branch or crosslink which is introduced via the organic substituents, and a branch or crosslink within the silicone chain. Organic crosslinkers for forming siloxane skeletons bearing SiH groups are, for example, α,ω-unsaturated diolefins, divinyl compounds or diallyl compounds, as described, for example, in U.S. Pat. No. 6,730,749 or EP 0 381 318. This crosslinking by platinum-catalysed hydrosilylation, which takes place downstream of the equilibration, means an additional process step in which both intramolecular bond formation and intermolecular bond formation can occur. The product properties are additionally strongly influenced by the different reactivities of the low molecular weight organic difunctional compounds which tend to form peroxide.

Multiple crosslinking of the silicone block of an organically modified polysiloxane with the organic block copolymer can be effected in various ways. EP 0 675 151 describes the preparation of a polyethersiloxane by hydrosilylation of a hydrosiloxane with a deficiency of hydroxy-functional allyl polyether, in which unconverted SiH functions are bonded with addition of sodium methoxide to the hydroxyl groups of the polyether substituents via an SiOC bond. The increase in molar mass leads to a wide scatter in the product properties, for example the viscosity. A similar approach to the formation of branched systems is described by U.S. Pat. No. 4,631,208, in which hydroxy-functional polyethersiloxanes are crosslinked by means of trialkoxysilanes. The two methods lead to intermolecular crosslinking of the polyethersiloxanes with both difficult control of the increase in molar mass and associated, unforeseeable viscosity rises. When the aforementioned methods are pursued, branching within the siloxane moiety at constant molar mass is not obtained, but rather crosslinking to form macromolecular multiblock copolymers.

Branching within the siloxane chain therefore has to be effected as early as in the preparation of the hydrosiloxane, in order to avoid the described disadvantages of crosslinking. Branches within the siloxane chain require the synthetic incorporation of trifunctional silanes, for example trichlorosilanes or trialkoxysilanes.

As is known to those skilled in the art, the hydrolysis rate of the organochlorosilanes rises in the following sequence (C. Eaborn, *Organosilicon Compounds*, Butterworths Scientific Publications, London 1960, p. 179)

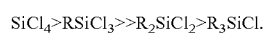

In the hydrolysis and condensation reactions of trichlorosilanes, there is therefore an increased tendency to form highly crosslinked gels compared to the slower hydrolysis and condensation reactions of difunctional and monofunctional organochlorosilanes. The established processes for hydrolysis and condensation of dichloro- and monochlorosilanes are therefore not immediately applicable to trichlorosilanes, and it is instead necessary to take alternative routes via multistage processes.

Building on this finding, the preparation of monobranched hydrosiloxanes by incorporation of not more than one trifunctional monomer per siloxane chain also has to be performed in two stages according to the prior art. In a first step, a trifunctional, low molecular weight hydrosiloxane is prepared by hydrolysis and condensation from 1,1,3,3-tetramethyldisiloxane and methyltriethoxysilane, as taught, for example, by DE 37 16 372. Only in a second step can an equilibration with cyclic siloxanes to higher molecular weights then be effected, as stated by DE 10 2005 004676. For further reaction—and therefore not until in a third step—the monobranched hydrosiloxane thus prepared can be provided with organic substituents by the methods known per se for functionalization of siloxane compounds having SiH groups.

For the synthesis of polybranched hydrosiloxanes which, by definition, have more than one trifunctional monomer per siloxane chain, two-stage syntheses can likewise be found in the prior art. In principle, there is the possibility of proceeding from hydrosiloxanes and of converting the SiH functions with addition of water and noble metal catalyst by dehydrogenation to silanols, which are then in turn condensed with hydrosiloxanes. This procedure is described in U.S. Pat. No. 6,790,451 and EP 1 717 260. Apart from the costs of the noble metal catalysis, the poor storage stability of the silanols, which tend to autocondense, hinders a reproducible, controlled process.

A further possibility, described in U.S. Pat. No. 6,790,451, consists in the preparation of a copolymer from trichloromethylsilane or trialkoxymethylsilane with hexamethyldisiloxane or trimethyl-chlorosilane, also referred to there as MT polymer, which is equilibrated in a second step together with a polydimethyl-(methylhydro)siloxane copolymer. The preparation of such MT polymers requires the use of strong bases or strong acids, in some cases in combination with high reaction temperatures, and gives rise to prepolymers of such high viscosity that their neutralization is considerably hindered, and thus the further processing to end products of constant composition and quality is significantly restricted.

According to EP 0 675 151, the hydrolysis and condensation of the SiH-free, branched silicone polymer is first performed in xylene, and, in the second step, the equilibration with methylhydropolysiloxane leads to the branched hydrosiloxane. Here too, two process steps are absolutely necessary, in which the SiH functions are not introduced until the second step.

It was therefore an object of the present invention to provide a simple, one-stage process for preparing branched hydrosiloxanes, without degrading the SiH functions which have been introduced by the starting materials in side reactions, and without the necessity to use aliphatic and/or aromatic solvents to form an additional auxiliary phase.

It has now been found that, surprisingly, condensation and equilibration of SiH-functional siloxanes with trialkoxysilanes is possible under hydrolytically acidic conditions in only one step with very substantial retention of SiH functions introduced. This result is completely surprising to the person skilled in the art, since neither the described gelation tendency of trifunctional silanes nor the side reaction of an acid-induced dehydrogenative SiH degradation (C. Eaborn, *Organosilicon Compounds*, Butterworths Scientific Publications, London 1960, p. 200) are noticeably troublesome.

The present invention therefore provides a process according to claim 1 for preparing branched SiH-functional siloxanes by converting a mixture comprising
a) one or more SiH-functional siloxanes,
b) one or more SiH function-free siloxanes and
c) one or more trialkoxysilanes,
with addition of water and in the presence of at least one Brønsted-acidic catalyst, which is characterized in that the reaction is performed in one process step, and also the hydrosiloxanes thus prepared.

The present invention likewise provides for the use of the hydrosiloxanes thus prepared for preparing organically modified polysiloxanes branched in the siloxane chain, and the thus prepared organically modified polysiloxanes branched in the siloxane chain, and their use as interface-active silicone surfactants.

Further subject-matter of the invention is characterized by the description which follows and the contents of the claims/subclaims.

The process according to the invention has the advantage that branched SiH-functional siloxanes can be prepared in a single process step. The process also has the advantage that, in the course of conversion, the SiH functions, especially the terminal SiH functions, are lost only to a minor degree, if at all. Especially the lack of degradation of the terminal SiH functions (dimethylhydrosiloxy units), which is expected by the person skilled in the art, is surprising.

The process according to the invention also has the advantage that no phase separation is required, in the case of which, firstly, the aqueous auxiliary phase has to be disposed of as waste and, secondly, the product has to be purified by distilling off the nonpolar solvents used, for example toluene or xylene. The process according to the invention requires essentially merely a gentle distillative removal of the low-boiling reaction products, specifically of the alcohols which arise from the hydrolysis and condensation.

With regard to the quality and storage stability of the end products, the process according to the invention has the advantage that the branched hydrosiloxanes prepared in accordance with the invention and the conversion products manufactured therefrom have no gelation tendency and can thus be stored over a longer period, without the viscosity of the products varying significantly.

The process according to the invention for preparing branched SiH-functional siloxanes and the use thereof for preparing organically modified polysiloxanes branched in the siloxane chain, and the use thereof, are described by way of example hereinafter, without any intention that the invention be restricted to these illustrative embodiments. When ranges, general formulae or compound classes are specified below, these are intended to comprise not just the corresponding ranges or groups of compounds which are mentioned explicitly, but also all sub-ranges and sub-groups of compounds which can be obtained by selecting individual values (ranges) or compounds. When documents are cited in the context of the present description, their contents shall be incorporated fully into the disclosure-content of the present invention.

The different monomer units of the compounds specified in the formulae (siloxane chains or polyoxyalkylene chain) may have a mutual blockwise structure or be present in random distribution. The indices used in the formulae, especially the indices k, m, $m^1$, n and $n^1$, should be considered as statistical mean values. In accordance with the usual definition, the degree of branching k is given by the number of silicon atoms bonded to three oxygen atoms.

The process according to the invention for preparing branched SiH-functional siloxanes by converting a mixture comprising
a) one or more SiH-functional siloxanes,
b) one or more SiH function-free siloxanes and
c) one or more trialkoxysilanes,
with addition of water and in the presence of at least one Brønsted-acidic catalyst, is characterized in that the reaction is performed in one process step. Preferably, the process according to the invention prepares hydrosiloxanes with branching in the siloxane chain of the general formula (I)

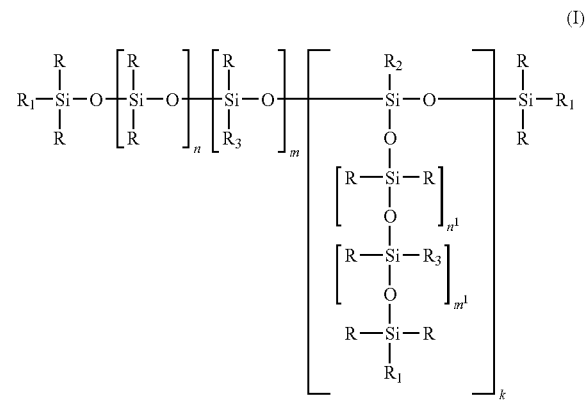

in which
n and $n^1$ are each independently 0 to 500, preferably 10 to 200, preferentially 15 to 100, and $(n+n^1)<500$, preferably <200, preferentially <100,
m and $m^1$ are each independently 0 to 60, preferably 0 to 30, preferentially 0.1 to 25, and $(m+m^1)<60$, preferably <30, preferentially <25,
k is 1 to 10, preferably 1 to 5,
R is at least one radical from the group of linear, cyclic or branched, aliphatic or aromatic, saturated or unsaturated hydrocarbon radicals having 1 up to 20 carbon atoms, but is preferably a methyl radical,
$R_1$ is independently hydrogen or R,
$R_2$ is independently hydrogen, R or a heteroatom-substituted, functional, organic, saturated or unsaturated radical, preferably selected from the group of the alkyl, chloroalkyl, chloroaryl, fluoroalkyl, cyanoalkyl, acryloyloxyaryl, acryloyloxyalkyl, methacryloyloxyalkyl (often also named methacryloxyalkyl), methacryloyloxypropyl (often also named methacryloxypropyl or propylmethacrylate) or vinyl radicals, more preferably a methyl, chloropropyl, vinyl or methacryloyloxypropyl radical, $R_3$ is independently hydrogen or R, with the proviso that at least one of the $R_1$, $R_2$ and $R_3$ radicals is hydrogen. Preferably, all R radicals and all $R_1$ to $R_3$ radicals which are an R radical are a methyl radical.

The resulting branched SiH-functional siloxanes, preferably the branched SiH-functional siloxanes of the formula (I) may be those in which the SiH functions are purely in terminal positions, purely in pendant positions or in a mixture of terminal and pendant positions in the siloxane.

The SiH-functional siloxanes used may be those in which the SiH functions are present purely in terminal positions, purely in pendant positions or in a mixture of terminal and pendant positions in the siloxane. The SiH-functional siloxanes used may, for example, be linear polymethylhydrosiloxanes, for example HMS-993 from Gelest Inc., linear polydimethylmethylhydrosiloxanes, for example HMS-031 and/or HMS-071 from Gelest Inc., linear α,ω-dihydropolydimethyl-siloxanes, for example 1, 1,3,3-tetramethyldisiloxane and/or 1,1,3,3,5,5-hexamethyltrisiloxane, relatively high molecular weight oligomers, for example DMS-H03 and/or DMS-H11 from Gelest Inc., cyclic polymethylhydrosiloxanes, for example tetramethylcyclotetrasiloxane or pentamethylcyclopentasiloxane, and cyclic polydimethylmethylhydrosiloxanes, for example heptamethylcyclotetrasiloxane and/or nonamethylcyclo-pentasiloxane, or mixtures thereof. The SiH-functional siloxanes used are more preferably 1,1,3,3-tetramethyl-disiloxane, DMS-H03, HMS-993 (each from Gelest Inc.) and pentamethylcyclopentasiloxane.

The SiH function-free siloxanes used may, for example, be linear polydimethylsiloxanes, for example hexamethyldisiloxane, or cyclic polydimethylsiloxanes, for example octamethyl-cyclotetrasiloxane and/or decamethylcyclopentasiloxane. Preference is given to using hexamethyldisiloxane and deca-methylcyclopentasiloxane.

The trialkyoxysilanes used may in principle be all trialkoxysilanes. The trialkoxysilanes used may be those in which the alkoxy radicals are all the same, all are different or some are the same. The trialkoxysilanes used may especially be triethoxysilanes, preferably methyltriethoxysilane, alkyltriethoxysilanes, for example n-propyltriethoxysilane, isobutyltriethoxysilane, pentyltriethoxysilane, hexyltriethoxy-silane, octyltriethoxysilane, hexadecyltriethoxysilane, n-octa-decyltriethoxysilane, halogen-containing or pseudohalogen-containing alkyltrialkoxysilanes, especially alkyl-triethoxysilanes, for example chloropropyltriethoxysilane, tridecafluoro-1,1,2,2-tetrahydrooctyltriethoxysilane, nonafluoro-1,1,2,2-tetrahydrohexyltriethoxysilane, 3-cyanopropyl-triethoxysilane, trialkoxysilanes, especially triethoxysilanes with functional groups, for example 3-methacryloyloxy-propyltriethoxysilane (3-trimethoxysilylpropyl methacrylate), 3-mercaptopropyltriethoxysilane, 5-(bi-cycloheptenyl)triethoxysilane, phenyltriethoxysilane, (p-chloromethyl)phenyltriethoxysilane, N-(3-triethoxysilyl-propyl)-4,5-dihydroimidazole or dihydro-3-[3-(triethoxysilyl)propyl]-furan-2,5-dione. It may be advantageous when organically functionalized trialkoxysilanes are used as the branching unit (are introduced by equilibration).

The proportions of chain-terminating trialkylsiloxy units, especially trimethylsiloxy units (M units) and/or dialkylhydrosiloxy units, especially dimethylhydrosiloxy units ($M^H$ units), of chain-extending dialkylsiloxy units, especially dimethylsiloxy units (D units) and/or alkylhydrosiloxy units, especially methylhydrosiloxy units ($D^H$ units), and of chain-branching alkylsiloxy units, especially methylsiloxy units (T units) and/or T units substituted by functional groups, can be varied over a wide range. The molar ratio of the sum total of M units and $M^H$ units to T units is preferably 3:1 to 1:1. When the molar amount of T units exceeds that of the M units, undesired, macromolecular, highly crosslinked gels up to resins are obtained.

The reaction mixture can be obtained by any kind of mixing of the components. Preference is given to first mixing the SiH-functional siloxanes, the SiH function-free siloxanes and the optionally substituted trialkoxysilanes.

Preferably, after the starting materials have been mixed, i.e. the SiH-functional siloxanes, the SiH function-free siloxanes and the trialkoxysilanes, at least one Brønsted-acidic catalyst for catalysis of the hydrolysis and condensation is added. The catalyst can be added directly to the reaction mixture in whole or in part, or be metered in during the reaction in any sequence.

Preference is given to first mixing the starting materials, then to adding the catalyst and then to adding the water.

The Brønsted-acidic catalysts used may be the acids known from the prior art (equilibration acids) for siloxanes, i.e. mineral acids, for example sulphuric acid, but also sulphonic acids, acidic aluminas or acidic ion exchange resins, for example the products known under the brand names Amberlite®, Amberlyst® or Dowex® and Lewatit®.

In the process according to the invention, it is possible to use both natural ion exchangers, for example zeolites, montmorillonites, attapulgites, bentonites and other aluminium silicates, and also synthetic ion exchangers. The latter are preferably solids (usually in grain form) with a three-dimensional, water-insoluble high molecular weight matrix based on phenol-formaldehyde resins or copolymers of styrene-divinylbenzene, into which numerous "anchor groups" of different acidity have been incorporated.

The Brønsted-acidic catalysts used in the process according to the invention are preferably those as described in EP 1 439 200. This document and the prior art documents cited therein are hereby incorporated as a reference and are considered to form part of the disclosure content of the present invention.

It may be advantageous when the catalyst used in the process according to the invention is at least one acid (catalyst 1) and at least one acidic ion exchange resin (catalyst 2). The acid used may be a mineral acid, preferably sulphuric acid and/or preferably an organic sulphonic acid, preferably trifluoromethanesulphonic acid. This mixture is preferably added directly to the reaction mixture. The catalyst used is preferably a mixture of trifluoromethanesulphonic acid and a sulphonic acid ion exchange resin, preferably Lewatit® K 2621 (Bayer Material Science).

When the catalyst used comprises the two catalysts 1 and 2, it may be advantageous when catalyst 1 is added first, preferably fully, to the mixture of starting materials, then the water is added, and catalyst 2 is added only after the preferably complete addition of water. However, catalysts 1 and 2 may also both be added to the starting materials before the addition of the water.

In the process according to the invention, the preferred amount of acidic catalyst is added to the reaction mixture is 0.01 to 10% by weight, based on the sum of the masses of the starting materials used (i.e. sum of the SiH-functional siloxanes, of the SiH function-free siloxanes and of the trialkoxysilanes). According to the type and concentration of the catalyst used, particular subranges of this range may be preferred. Particular preference is given, for example, to the use of trifluoromethanesulphonic acid in amounts of 0.05% by weight to 0.5% by weight. When the catalyst used is an ion exchange resin alone, the mass of catalyst used is preferably 3 to 10% by weight. When the catalyst used is a combination of mineral acid and/or organic sulphonic acid with an ion exchange resin, the mass of ion exchange resin used is preferably 3 to 6% by weight.

In the process according to the invention, preferably 0.5 to 30 mol of water are used per mole of trialkoxysilane used. For the hydrolysis and condensation, preferably 1 to 5 mol of water are used per mole of trifunctional trialkoxysilane. The water can be added in one step or preferably metered in over a longer period. Owing to the amount of water selected, a phase separation usually does not occur. If appropriate, the water, for better homogenization, can be admixed with a small amount, based on the total weight of siloxanes, of a short-chain alcohol, for example with methanol or ethanol. A small amount is defined as an amount which is sufficient to homogenize the water entirely or partly in the reaction mixture and does not lead to the formation of a separate phase.

The reaction is performed in the process according to the invention preferably at a temperature of 0° C. to 100° C. Preference is given to conducting the reaction (simultaneous performance of hydrolysis, condensation and equilibration reactions) at a temperature of 20 to 60° C.

After the reaction has ended, the volatile by-products of the condensation can be removed, for example by gentle vacuum distillation. If required or desired, a neutralization can be effected, for example with a basic salt, preferably with sodium hydrogencarbonate.

The inventive chain-branched hydrosiloxanes thus obtained are preferably stable, clear, colourless liquids which preferably contain no or only minor proportions of volatile low molecular weight compounds. The SiH equivalents weighed in via the reactant mixture, i.e. measured before the reaction, and the SiH equivalents measured in the hydrosiloxanes prepared by the process according to the invention (i.e. after the reaction) are consistent within the accuracy of analysis, which demonstrates the very substantial retention of the SiH functions used.

The process according to the invention makes it possible to prepare hydrosiloxanes branched in the siloxane chain, especially those of the formula (I). The hydrosiloxanes branched in the siloxane chain preferably have a viscosity, measured with a rotary viscometer of the Haake RV12 brand, at 25° C., of 10 to 2000 mPa*s, preferably of 15 to 600 mPa*s. The mean degree of branching of the inventive hydrosiloxanes branched in the siloxane chain is preferably 1 to 10, preferentially 1 to 5. The inventive hydrosiloxanes branched in the siloxane chain can be used to prepare organically modified polysiloxanes branched in the siloxane chain.

In a preferred embodiment of the process according to the invention, organically modified polysiloxanes branched in the siloxane chain are prepared by full or partial reaction of the hydrosiloxanes branched in the siloxane chain prepared in accordance with the invention, preferably hydrosiloxanes of the formula (I), with compounds which have at least one, preferably exactly one, double bond per molecule, by noble metal-catalysed, especially platinum-catalysed, hydrosilylation. This reaction preferably affords copolymers of the general formula (II)

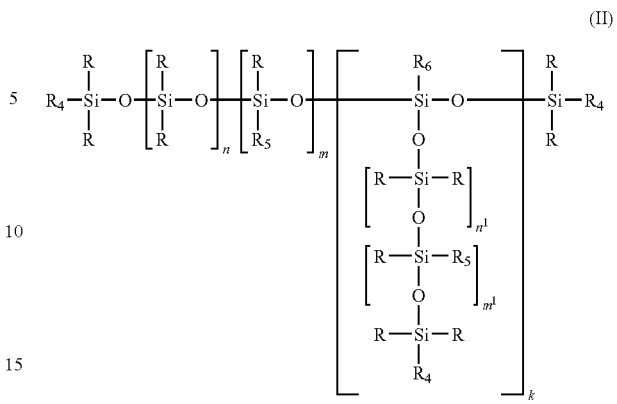

in which n and $n^1$ are each independently 0 to 500, preferably 10 to 200, especially 15 to 100, and $(n+n^1)<500$, preferably <200, especially <100, m and $m^1$ are each independently 0 to 60, preferably 0 to 30, especially 0.1 to 25, and $(m+m^1)<60$, preferably <30, especially <25, k is 1 to 10, preferably 1 to 5, R is at least one radical from the group of linear, cyclic or branched, aliphatic or aromatic, saturated or unsaturated hydrocarbon radicals having 1 up to 20 carbon atoms, preferably a methyl radical, all R radicals more preferably being methyl radicals, $R_4$ is R and/or

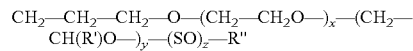

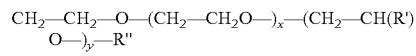

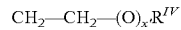

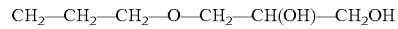

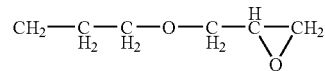

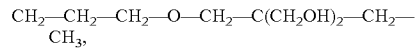

in which x is 0 to 100, preferably 0 to 50, x' is 0 or 1, y is 0 to 100, preferably 0 to 50, z is 0 to 100, preferably 0 to 10, R' is an optionally substituted alkyl or aryl group, for example substituted by alkyl radicals, aryl radicals or haloalkyl or haloaryl radicals, and having 1 to 12 carbon atoms, and R" is a hydrogen radical or an alkyl group having 1 to 4 carbon atoms, a —C(O)—R''' group where R'''=alkyl radical, a —CH$_2$—O—R' group, an alkylaryl group, for example a benzyl group, the —C(O)NH—R' group, R$^{IV}$ is an optionally substituted hydrocarbon radical, for example substituted by halogens, and having 1 to 50, preferably 9 to 45 and preferentially 13 to 37 carbon atoms, SO is a styrene oxide radical —CH(C$_6$H$_5$)—CH$_2$—O—, R$_5$ may be R and/or R$_4$, R$_6$ may be R, R$_4$ and/or a functional, organic, saturated or unsaturated radical which is substituted by heteroatoms and is selected from the group of the alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radical, with the proviso that at least one substituent from R$_4$, R$_5$ and R$^6$ is not R. The different monomer units of the siloxane chain and also of the polyoxyalkylene chain may have an alternating blockwise structure or be subject to a random distribution.

The noble metal-catalysed hydrosilylation of the inventive branched hydrosiloxanes can be carried out, for example, as described in the prior art, for example in EP 1 520 870. Document EP 1 520 870 is hereby incorporated as reference and is considered to form part of the disclosure-content of the present invention.

The compounds used which have at least one double bond per molecule may, for example, be α-olefins, vinylpolyoxyalkylenes and/or allylpolyoxyalkylenes. Preference is given to using vinylpolyoxyalkylenes and/or allylpolyoxyalkylenes. Particularly preferred vinylpolyoxyalkylenes are, for example, vinylpolyoxyalkylenes having a molar mass in the range from 100 g/mol to 5000 g/mol, which may be formed from the monomers propylene oxide, ethylene oxide, butylene oxide and/or styrene oxide in blockwise or random distribution and which may be either hydroxy-functional or end-capped by a methyl ether function or an acetoxy function. Particularly preferred allylpolyoxyalkylenes are, for example, allylpolyoxyalkylenes having a molar mass in the range from 100 g/mol to 5000 g/mol, which may be formed from the monomers propylene oxide, ethylene oxide, butylene oxide and/or styrene oxide in blockwise or random distribution, and which may be either hydroxy-functional or end-capped by a methyl ether function or an acetoxy function. Particular preference is given to using, as the compounds which have at least one double bond per molecule, the α-olefins, vinylpolyoxyalkylenes and/or allylpolyoxyalkylenes specified in the examples.

In a further preferred embodiment of the process according to the invention, organically modified polysiloxanes branched in the siloxane chain are prepared by full or partial reaction of the hydrosiloxanes branched in the siloxane chain prepared in accordance with the invention, preferably hydrosiloxanes of the formula (I), with compounds which have one hydroxyl group per molecule by Lewis acid-catalysed dehydrogenative connection. The Lewis acid-catalysed dehydrogenative connection of hydroxy-functional compounds to the branched hydrosiloxanes prepared in accordance with the invention, especially those of the formula (I), can be carried out as described in the prior art. Preference is given to effecting the dehydrogenative connection as described in DE 10 2005 004 676, which is hereby incorporated as a reference and is considered to form part of the disclosure-content of the present invention.

The dehydrogenative connection preferably affords copolymers of the general formula (III)

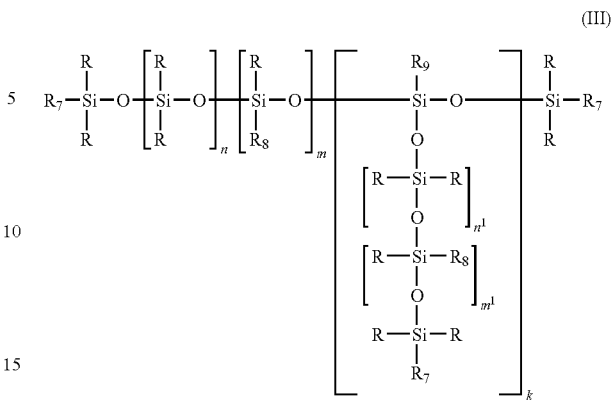

in which n and n$^1$ are each independently 0 to 500, preferably 10 to 200, preferentially 15 to 100, and (n+n$^1$)<500, preferably <200, preferentially <100, m and m$^1$ are each independently 0 to 60, preferably 0 to 30, preferentially 0.1 to 25, and (m+m$^1$)<60, preferably <30, preferentially <25, k is 1 to 10, preferably 1 to 5, R is at least one substituent from the group of linear, cyclic or branched, aliphatic or aromatic, saturated or unsaturated hydrocarbon radicals having 1 up to 20 carbon atoms, preferably a methyl radical, all R radicals more preferably being a methyl radical, R$_7$ is R and/or

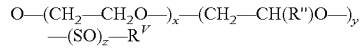

where x, y, z, R' and SO are each as defined for the formula (II) and

R$^V$ is a linear, cyclic or branched, saturated or unsaturated alkyl radical optionally substituted by heteroatoms, R$_8$ may be R and/or R$_7$, R$_9$ may be R, R$_7$ and/or a functional, organic, saturated or unsaturated radical which is substituted by heteroatoms and is selected from the group of the alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radicals, with the proviso that at least one of the R$_7$, R$_8$ and R$_9$ radicals is not R.

The hydroxy-functional compounds used are preferably hydroxy-functional polyoxyalkylenes. Particularly preferred compounds are, for example, methylpolyoxyalkenols or butylpolyoxyalkenols with a molar mass in the range from 100 g/mol to 5000 g/mol, which may be formed from the monomers propylene oxide, ethylene oxide, butylene oxide and/or styrene oxide in blockwise or random distribution. Particular preference is given to using, as the hydroxy-functional compounds, the hydroxy-functional polyoxyalkylenes specified in the examples.

By virtue of the use of the inventive hydrosiloxanes branched in the siloxane chain for preparing organically modified polysiloxanes branched in the siloxane chain, it is possible to obtain corresponding organically modified polysiloxanes branched in the siloxane chain, especially those of the formulae (II) or (III). These inventive organically modified polysiloxanes branched in the siloxane chain, or those prepared in accordance with the invention, can be used, for example, as interface-active silicone surfactants.

The organically modified and especially polyether-modified branched siloxanes (k≥1) claimed in accordance with the invention may find use in industrial applications alone or else in a blend with other unbranched organically modified siloxanes (k<1) as valuable interface-active ingredients. More particularly, the blend described here permits the definition of a broad spectrum of action of such surfactants, which are used in the production of polyurethane foams, for example as foam stabilizers.

It is obvious that the blending of the organically modified and especially polyether-modified, branched siloxanes (k≥1) claimed in accordance with the invention with unbranched siloxanes can afford mixtures which are valuable interface-active ingredients, but which, according to the mixing ratio, may also have a mean molecular degree of branching of >1. It is also obviously possible to mix the organically modified and especially polyether-modified branched siloxanes (k≥1) claimed in accordance with the invention with silicon-free compounds, for example solvents, especially glycols or polyethers, in wide ranges. Such mixtures may also be valuable interface-active compositions. The mean molecular degree of branching determined by $^{29}$Si NMR, by its nature, does not change in this case.

In the examples adduced below, the present invention is described by way of example, without any intention that the invention, whose breadth of application is evident from the entire description and the claims, be restricted to the embodiments specified in the examples.

The viscosities specified in the examples have been determined with a rotary viscometer of the Haake RV12 brand at 25° C. The mean degree of branching indicates the number of branches at one silicon atom (the number of T units) in the molecule, averaged over all molecules.

EXAMPLE 1

Inventive 44.2 g (0.248 mol) of methyltriethoxysilane (Dynasylan® MTES from Evonik Degussa GmbH), 138.3 g of an α,ω-dihydropoly-dimethylsiloxane with a hydrogen content of 3.09 eq SiH/kg and 95.1 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.16 ml of trifluoromethanesulphonic acid (obtainable from Sigma Aldrich) was added and the mixture was stirred for 30 minutes. Within a further 30 minutes, a mixture of 13.4 g of deionized water and 20 ml of methanol was added dropwise with stirring and the mixture was stirred for a further 30 minutes. The reaction mixture was heated to 40° C. for 1 hour, and then excess water and alcohol were distilled off at 40° C. in a water-jet pump vacuum of approx. 50 mbar for 1 hour. Thereafter, the mixture was left to continue to react at 40° C. for a further 4 hours, 5.7 g of sodium hydrogencarbonate were stirred in and the mixture was filtered. A clear, colourless liquid with a hydrogen content of 1.62 eq SiH/kg (theoretical value=1.64 eq SiH/kg) was obtained. A Bruker DPX 400 NMR system was used to record a $^{29}$Si NMR spectrum of the resulting product, which was evaluated with the internal software. From the $^{29}$Si NMR spectrum, a mean degree of branching of 2.0 was calculated.

EXAMPLE 2

Inventive 44.2 g (0.248 mol) of methyltriethoxysilane (Dynasylan® MTES from Evonik Degussa GmbH), 138.3 g of an α,ω-dihydropoly-dimethylsiloxane with a hydrogen content of 3.09 eq SiH/kg and 95.1 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 17.1 g of a predried sulphonic acid cation exchange resin (Lewatit® K 2621, water content 10% by weight—determined on the basis of the Karl-Fischer method) were added and the mixture was stirred for 30 minutes. Within a further 30 minutes, a mixture of 6.7 g of deionized water and 10 ml of methanol was added dropwise with stirring and the mixture was stirred for a further 30 minutes. The reaction mixture was heated to 40° C. for 1 hour, and then excess water and alcohol were distilled off at 40° C. in a water-jet pump vacuum of approx. 50 mbar for 1 hour. Thereafter, the mixture was allowed to continue to react at 40° C. for a further 4 hours and filtered. A clear, colourless liquid having a hydrogen content of 1.60 eq SiH/kg (theoretical value=1.64 eq SiH/kg) was obtained. From the $^{29}$Si NMR spectrum, a mean degree of branching of 1.8 was calculated.

EXAMPLE 3

Inventive 44.2 g (0.248 mol) of methyltriethoxysilane (Dynasylan@ AYES from Evonik Degussa GmbH), 138.3 g of an α,ω-dihydropoly-dimethylsiloxane with a hydrogen content of 3.09 eq SiH/kg and 95.1 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.16 ml of trifluoromethanesulphonic acid was added and the mixture was stirred for 30 minutes. Within a further 30 minutes, a mixture of 13.4 g of deionized water and 20 ml of methanol was added dropwise with stirring and the mixture was stirred for a further 30 minutes. The reaction mixture was heated to 40° C. for 1 hour, and then excess water and alcohol were distilled off at 40° C. in a water-jet pump vacuum of approx. 50 mbar for 1 hour. After neutralization with 5.7 g of sodium hydrogencarbonate and filtration, 17.1 g of the predried sulphonic acid cation exchange resin Lewatit® K 2621 were added, and the mixture was stirred at 40° C. for 4 hours and filtered. A clear, colourless liquid with a viscosity of 35 mPa*s and a hydrogen content of 1.60 eq SiH/kg (theoretical value=1.64 eq SiH/kg) was obtained. From the $^{29}$Si NMR spectrum, a mean degree of branching of 2.7 was calculated.

EXAMPLE 4

Noninventive 44.2 g (0.248 mol) of methyltriethoxysilane (Dynasylan® MTES from Evonik Degussa GmbH) and 95.1 g of decamethylcyclopenta-siloxane (obtainable from Gelest Inc.) were initially charged in a four-neck flask equipped with a precision glass stirrer, an internal thermometer, a dropping funnel and a distillation apparatus with stirring at room temperature, 0.08 ml of trifluoromethanesulphonic acid was added and the mixture was stirred at 50° C. for 6 hours. Within 30 minutes, a mixture of 6.7 g of deionized water and 10 ml of methanol was added dropwise with stirring and the mixture was stirred for a further 30 minutes. The reaction mixture was heated to 40° C. for 1 hour and then excess water and alcohol were distilled off in a water-jet pump vacuum of approx. 50 mbar at 40° C. for 1 hour. A solid, transparent gel cake was obtained.

EXAMPLE 5

Noninventive 44.2 g (0.248 mol) of methyltriethoxysilane (Dynasylan® MTES from Evonik Degussa GmbH) and 95.1 g of decamethylcyclopenta-siloxane (obtainable from Gelest Inc.) were initially charged in a four-neck flask equipped with a precision glass stirrer, an internal thermometer, a dropping funnel and a distillation apparatus with stirring at room temperature, 0.08 ml of trifluoromethanesulphonic acid was added and the mixture was preequilibrated at 50° C. for 6 hours. 138.3 g of an α,ω-dihydropolydimethylsiloxane with a hydrogen content of 3.09 eq SiH/kg were added at room temperature and, after stirring for 30 minutes, a mixture of 6.7 g of deionized water and 10 ml of methanol was added dropwise within 15 minutes. After stirring for 30 minutes, the mixture was heated to 40° C. for 1 hour and then excess water and alcohol were distilled off in a water-jet pump vacuum of approx. 50 mbar at 40° C. for 1 hour. 5.7 g of sodium hydrogencarbonate were stirred in and filtered off. A clear, colourless liquid having a hydrogen content of only 0.92 eq SiH/kg compared to the calculated target value of 1.65 eq SiH/kg was obtained.

EXAMPLE 6

Inventive 44.6 g (0.25 mol) of methyltriethoxysilane (Dynasylan® NITS from Evonik Degussa GmbH), 139.4 g of an α,ω-dihydropoly-dimethylsiloxane with a hydrogen content of 3.09 eq SiH/kg and 95.8 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.15 ml of trifluoromethanesulphonic acid was added and the mixture was stirred for 30 minutes. Within a further 30 minutes, a mixture of 6.75 g of deionized water and 6.75 g of ethanol was added dropwise with stirring, and then 15 g of the predried sulphonic acid cation exchange resin Lewatit® K 2621 were added (water content as in Example 2). After stirring at 40° C. for 1 hour, excess water and alcohol were distilled off at 40° C. and 5 mbar for 1 hour. The ion exchange resin was filtered off, 5.6 g of sodium hydrogencarbonate were stirred in for 30 min, and the mixture was filtered. A clear, colourless liquid having a viscosity of 23.3 mPa*s and a hydrogen content of 1.61 eq SiH/kg (theoretical value=1.65 eq SiH/kg) was obtained. From the $^{29}$Si NMR spectrum, a mean degree of branching of 3.7 was calculated.

EXAMPLE 7

Inventive

In a 500 ml four-neck flask with attached precision glass stirrer, reflux condenser and internal thermometer, 100 g of the branched hydrosiloxane prepared according to Example and having the hydrogen content of 1.60 eq SiH/kg and 328.5 g of a methyl end-capped allylpolyoxyalkylene having a mean molecular weight of 1502 g/mol (determined by iodine number), a propylene oxide content of 58% by weight and an ethylene oxide content of 42% by weight were heated to 70° C. with stirring. 5 ppm of platinum were added in the form of a platinum(0) catalyst modified according to EP 1 520 870 with a syringe. The conversion determined by gas volumetric means was quantitative after 2.5 hours. The clear, yellowish, SiC-bonded product had a viscosity of 318 meas.

EXAMPLE 8

Inventive

In a 500 ml four-neck flask with attached precision glass stirrer, reflux condenser, dropping funnel and internal thermometer, 190 g of a hydroxy-functional butylpolyoxyalkylene with a mean molecular weight of 1439 g/mol (determined by the OH number), a propylene oxide content of 58% and an ethylene oxide content of 42% were initially charged in 100 g of toluene at 100° C., and 0.25 g of tris(pentafluorophenyl)borane was added. Over a period of 45 minutes, 60 g of the branched hydrosiloxane described in Example 3 were added dropwise. Significant evolution of gas was observed. After a reaction time at 100° C. of 2 hours, the conversion determined by gas volumetric means was quantitative.

The reaction mixture was filtered through a fluted filter and the solvent was distilled off at 70° C. and 10 mbar on a rotary evaporator. The slightly cloudy product had a viscosity of 219 mPa*s.

EXAMPLE 9

Inventive 42.1 g (0.24 mol) of methyltriethoxysilane (Dynasylan® MTES from Evonik Degussa GmbH), 25.1 g of a polymethylhydrosiloxane with a hydrogen content of 15.71 eq SiH/kg, 126.4 g of an α,ω-dihydropolydimethylsiloxane having a hydrogen content of 3.09 eq SiH/kg and 82.6 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.167 ml of trifluoromethanesulphonic acid was added and the mixture was stirred for 30 minutes. Within a further 30 minutes, a mixture of 6.4 g of deionized water and 8.1 ml of ethanol was added dropwise with stirring and the mixture was stirred for a further 30 minutes. The reaction mixture was heated to 40° C. for 1 hour, and then excess water and alcohol were distilled off in a water-jet pump vacuum of approx. 10 mbar at 40° C. for 2 hours. After neutralization with 5.5 g of sodium hydrogencarbonate and filtration, 16.6 g of the predried sulphonic acid cation exchange resin Lewatit® K 2621 were added, and the mixture was stirred at 40° C. for 4 hours and filtered. A clear, colourless liquid having a viscosity of 20.8 mPa*s and a hydrogen content of 3.01 eq SiH/kg (theoretical value=3.08 eq SiH/kg) was obtained. From the $^2$Si NMR spectrum, a mean degree of branching of 3.05 was calculated.

EXAMPLE 10

Inventive

In a 500 ml four-neck flask with attached precision glass stirrer, reflux condenser and internal thermometer, 60 g of the branched hydrosiloxane with the hydrogen content of 3.01 eq SiH/kg prepared according to Example 9 and 204.8 g of a hydroxy-functional allylpolyoxyalkylene having a mean molecular weight of 848 g/mol (determined by iodine number), a propylene content of 26% by weight and an ethylene oxide content of 74% by weight were heated to 70°

C. with stirring. 5 ppm of platinum were added in the form of a platinum(0) catalyst modified according to EP 1 520 870 with a syringe. The conversion determined by gas volumetric means was quantitative after 3 hours. The clear, yellowish, SiC-bonded product had a viscosity of 219.0 mPa*s.

EXAMPLE 11

Inventive 46.7 g (0.245 mol) of vinyltriethoxysilane (Dynasylan® VTEO from Evonik Degussa GmbH), 137.7 g of an α,ω-dihydropoly-dimethylsiloxane having a hydrogen content of 3.09 eq SiH/kg and 92.9 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.167 ml of trifluoromethanesulphonic acid was added and the mixture was stirred for 30 minutes. Within a further 30 minutes, a mixture of 6.6 g of deionized water and 8.3 ml of ethanol was added dropwise with stirring and the mixture was stirred for a further 30 minutes. The reaction mixture was heated to 40° C. for 1 hour, and then excess water and alcohol were distilled off in a water-jet pump vacuum of approx. 10 mbar at 40° C. for 2 hours. After neutralization with 5.5 g of sodium hydrogencarbonate and filtration, 16.6 g of the predried sulphonic acid cation exchange resin Lewatit® K 2621 were added, and the mixture was stirred at 40° C. for 4 hours and filtered. A clear, colourless liquid having a viscosity of 18.2 mPa*s and a hydrogen content of 1.58 eq SiH/kg (theoretical value=1.635 eq SiH/kg) was obtained. From the $^{29}$Si NMR spectrum, a mean degree of branching of 2.4 was calculated.

EXAMPLE 12

Inventive 57.6 g (0.231 mol) of 3-methacryloyloxypropyltrimethoxysilane (Dynasylan® MEMO from Degussa), 130.2 g of an α,ω-dihydropoly-dimethylsiloxane having a hydrogen content of 3.09 eq SiH/kg and 87.9 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.165 ml of trifluoromethanesulphonic acid was added and the mixture was stirred for 30 minutes. Within a further 30 minutes, a mixture of 6.3 g of deionized water and 8.0 ml of ethanol was added dropwise with stirring and the mixture was stirred for a further 30 minutes. The reaction mixture was heated to 40° C. for 1 hour, and then excess water and alcohol were distilled off in a water-jet pump vacuum of approx. 10 mbar at 40° C. for 2 hours. After neutralization with 5.5 g of sodium hydrogencarbonate and filtration, 16.5 g of the predried sulphonic acid cation exchange resin Lewatit® K 2621 were added, and the mixture was stirred at 40° C. for 4 hours and filtered. A clear, colourless liquid having a viscosity of 23.6 mPa*s and a hydrogen content of 1.59 eq SiH/kg (theoretical value=1.55 eq SiH/kg) was obtained. From the $^{29}$Si NMR spectrum, a mean degree of branching of 2.2 was calculated.

EXAMPLE 13

Inventive 54.6 g of a polymethylhydrosiloxane with a hydrogen content of 15.71 eq SiH/kg, 3.5 g (0.02 mol) of methyltriethoxysilane (Dynasylan® MTES from Evonik Degussa GmbH), 1.3 g of hexamethyldisiloxane (obtainable from Gelest Inc.) and 191.9 g of decamethylcyclopentasiloxane (obtainable from Gelest Inc.) were initially charged in a four-neck flask equipped with a precision glass stirrer, an internal thermometer, a dropping funnel and a distillation apparatus with stirring at room temperature, 0.15 ml of trifluoromethanesulphonic acid was added and the mixture was stirred for 30 minutes. Within a further 30 minutes, a mixture of 0.54 g of deionized water and 0.54 g of ethanol was added dropwise with stirring and the mixture was stirred for a further 30 minutes. The reaction mixture was heated to 40° C. for 1 hour and then excess water and alcohol were distilled off in a water-jet pump vacuum of approx. 10 mbar at 40° C. within 1 hour. After neutralization with 5.0 g of sodium hydrogencarbonate and filtration, 15.0 g of the predried sulphonic acid cation exchange resin Lewatit® K 2621 (water content as in Example 2) were added, and the mixture was stirred at 70° C. for 4 hours and filtered. A clear, colourless liquid having a viscosity of 595.2 mPa*s and a hydrogen content of 3.50 eq SiH/kg (theoretical value 3.53 eq SiH/kg) was obtained. From the $^{29}$Si NMR spectrum, a mean degree of branching of 3.52 was calculated.

EXAMPLE 14

Inventive

In a 500 ml four-neck flask with attached precision glass stirrer, reflux condenser and internal thermometer, 81 g of the branched hydrosiloxane with the hydrogen content of 3.50 eq SiH/kg prepared according to Example 13 were heated to 70° C. with stirring and 5 ppm of platinum in the form of a platinum(0) catalyst modified according to EP 1 520 870 were added with a syringe. A dropping funnel was used to meter in, stepwise, 57.8 g of hexadecene (obtainable from Sigma Aldrich) and 18.4 g of a hydroxy-functional allylpolyoxyethylene having a mean molar mass of 409 g/mol (determined by iodine number). The conversion determined by gas volumetric means was 99% after hours. The slightly cloudy product had a viscosity of 19 640 mPa*s.

The inventive examples demonstrate that the process according to the invention can be used to prepare branched Si—H-functional siloxanes, without significant proportions of the theoretically expected SiH functions being degraded, as is the case in the comparative examples.

The invention claimed is:
1. A process for preparing a branched SiH-functional siloxane, the method comprising reacting a mixture of
   a) one or more SiH-functional siloxanes,
   b) one or more SiH function-free siloxanes, and
   c) one or more trialkoxysilanes,
   with addition of water in combination with methanol or ethanol in an amount sufficient to prevent formation of a separate phase and in the presence of at least one Brønsted-acidic catalyst to form a branched SiH-functional siloxane, wherein the reacting is performed in one process step; and wherein a distillative process is conducted during the process to remove alcohol byproduct formed during the process.
2. The process according to claim 1, wherein the branched SiH-functional siloxane is a hydrosiloxane with branching in the siloxane chain of general formula (I)

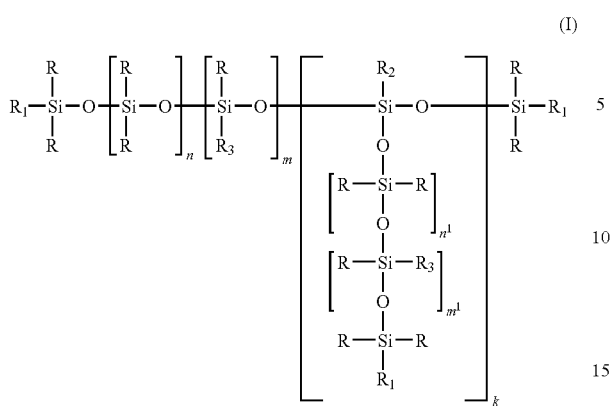

in which
n and $n^1$ are each independently 0 to 500 and $(n+n^1)$ is <500,
m and $m^1$ are each independently 0 to 60 and $(m+m^1)$ is <60,
k is 1 to 10,
R is at least one radical from the group of linear, cyclic or branched, aliphatic or aromatic, saturated or unsaturated hydrocarbon radicals having 1 up to 20 carbon atoms,
$R_1$ is independently hydrogen or R,
$R_2$ is independently hydrogen, R or a heteroatom-substituted, functional, organic, saturated or unsaturated radical selected from the group of the alkyl, chloroalkyl, chloroaryl, fluoroalkyl, cyanoalkyl, acryloyloxyaryl, acryloyloxyalkyl, methacryloyloxyalkyl, methacryloyloxypropyl or a vinyl radical,
$R_3$ is independently hydrogen or R,
with the proviso that at least one of the $R_1$, $R_2$ and $R_3$ radicals is hydrogen.

3. The process according to claim 1, wherein the reacting is performed at a temperature of 0° C. to 100° C.

4. The process according to claim 1, wherein the water is present in an amount from 0.5 to 30 mol per mole of said one or more trialkoxysilanes.

5. The process according to claim 1, wherein the at least one Brønsted-acidic catalyst is included in an amount of 0.01 to 10% by weight based on the sum of the mass of components a), b) and c).

6. The process according to claim 1, wherein the at least one Brønsted-acidic catalyst comprises at least one acid and at least one acidic ion exchanger.

7. The process according to claim 1, wherein the at least one Brønsted-acidic catalyst comprises a mixture of trifluoromethanesulphonic acid and a sulphonic acid ion exchanger.

8. The process according to claim 1, wherein the branched SiH-functional siloxane is a compound in which the SiH functions are only in terminal positions, only in pendant positions, or in a mixture of terminal and pendant positions in the siloxane.

9. The process according to claim 1, wherein organically functionalized trialkoxysilanes are included in the equilibrium as a branching unit.

10. A method for preparing organically modified polysiloxanes branched in the siloxane chain, the method comprising:
(i) preparing a branched SiH-functional siloxane by reacting a mixture of a) one or more SiH-functional siloxanes, b) one or more SiH function-free siloxanes and c) one or more trialkoxysilanes, with addition of water in combination with methanol or ethanol in an amount sufficient to prevent formation of a separate phase and in the presence of at least one Brønsted-acidic catalyst to form said branched SiH-functional siloxane, wherein the reacting is performed in one process step, and wherein a distillative process is conducted during the process to remove alcohol byproduct formed during the process; and
(ii) reacting, partially or fully, said branched SiH-functional siloxane with at least one compound that has one double bond per molecule in the presence of a noble metal catalyst.

11. The process according to claim 10, wherein said noble metal catalyst is a platinum-containing hydrosilylation catalyst.

12. The process according to claim 10, wherein said at least one compound that has one double bond per molecule is selected from vinylpolyoxyalkylenes, allylpolyoxyalkylenes, and combinations thereof.

13. The process according to claim 10, wherein said branched SiH-functional siloxane is also reacted, partially or fully, with compounds that have one hydroxyl group per molecule by Lewis acid-catalysed dehydrogenative connection.

14. The process according to claim 10, wherein said branched SiH-functional siloxane has the general formula (I):

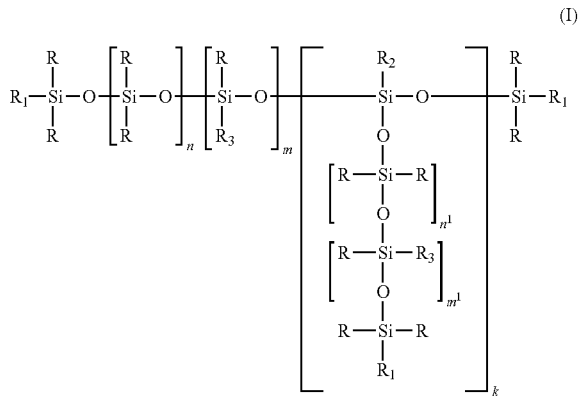

in which
n and $n^1$ are each independently 0 to 500 and $(n+n^1)$ is <500,
m and $m^1$ are each independently 0 to 60 and $(m+m^1)$ is <60,
k is 1 to 10,
R is at least one radical from the group of linear, cyclic or branched, aliphatic or aromatic, saturated or unsaturated hydrocarbon radicals having 1 and up to 20 carbon atoms,
$R_1$ is independently hydrogen or R,
$R_2$ is independently hydrogen, R or a heteroatom-substituted, functional, organic, saturated or unsaturated radical selected from the group of the alkyl, chloroalkyl, chloroaryl, fluoroalkyl cyanoalkyl, acryloyloxyaryl, acryloyloxyalkyl, methacryloyloxyalkyl, methacryloyloxypropyl or a vinyl radical,
$R_3$ is independently hydrogen or R,
with the proviso that at least one of the $R_1$, $R_2$ and $R_3$ radicals is hydrogen.

* * * * *